(12) United States Patent
Kobayashi et al.

(10) Patent No.: US 10,213,881 B2
(45) Date of Patent: Feb. 26, 2019

(54) BRAZING SHEET AND FLUX COMPOSITION

(71) Applicant: KOBE STEEL, LTD., Kobe-shi (JP)

(72) Inventors: Nobuhiro Kobayashi, Hyogo (JP); Toshiki Ueda, Tochigi (JP); Shimpei Kimura, Tochigi (JP); Takahiro Izumi, Tochigi (JP)

(73) Assignee: Kobe Steel, Ltd., Kobe-shi (JP)

( * ) Notice: Subject to any disclaimer, the term of this patent is extended or adjusted under 35 U.S.C. 154(b) by 537 days.

(21) Appl. No.: 14/786,768

(22) PCT Filed: Apr. 16, 2014

(86) PCT No.: PCT/JP2014/060868
§ 371 (c)(1),
(2) Date: Oct. 23, 2015

(87) PCT Pub. No.: WO2014/175143
PCT Pub. Date: Oct. 30, 2014

(65) Prior Publication Data
US 2016/0074972 A1 Mar. 17, 2016

(30) Foreign Application Priority Data
Apr. 25, 2013 (JP) .................................. 2013-093019

(51) Int. Cl.
*B23K 35/36* (2006.01)
*B23K 35/22* (2006.01)
(Continued)

(52) U.S. Cl.
CPC ...... *B23K 35/3605* (2013.01); *B23K 35/0238* (2013.01); *B23K 35/22* (2013.01);
(Continued)

(58) Field of Classification Search
None
See application file for complete search history.

(56) References Cited

U.S. PATENT DOCUMENTS

| 4,689,092 | A | 8/1987 | Suzuki et al. |
| 2013/0059162 | A1 | 3/2013 | Kobayashi et al. |
| 2015/0047745 | A1 | 2/2015 | Kobayashi et al. |

FOREIGN PATENT DOCUMENTS

| CN | 102950394 A | 3/2013 |
| JP | 60-37292 | 2/1985 |

(Continued)

OTHER PUBLICATIONS

International Search Report dated Jul. 1, 2014 in PCT/JP2014/060868 filed Apr. 16, 2014 (with English translation).

(Continued)

*Primary Examiner* — Daniel J. Schleis
(74) *Attorney, Agent, or Firm* — Oblon, McClelland, Maier & Neustadt, L.L.P.

(57) ABSTRACT

A brazing sheet includes a core material containing an aluminum alloy including magnesium, a bonding material laminated on at least one side of the core material, and a flux layer. The flux layer is laminated on one side of the bonding material and includes a flux composition. The flux composition includes [A] a flux component containing $KAlF_4$, and [B] $AlF_3$. A substance mass S1 (mol) of magnesium in the bonding material when heated at 585° C., a substance mass S2 (mol) of [A] the flux component containing $KAlF_4$ in the flux layer and a substance mass S3 (mol) of [B] $AlF_3$ satisfy the specific expression.

5 Claims, 2 Drawing Sheets

(51) Int. Cl.
*C22C 21/00* (2006.01)
*B23K 35/28* (2006.01)
*B23K 35/362* (2006.01)
*B23K 35/02* (2006.01)
*B32B 15/01* (2006.01)
*C22C 21/06* (2006.01)
*F28F 21/08* (2006.01)

(52) U.S. Cl.
CPC .......... *B23K 35/286* (2013.01); *B23K 35/362* (2013.01); *B32B 15/016* (2013.01); *C22C 21/00* (2013.01); *C22C 21/06* (2013.01); *B23K 35/28* (2013.01); *F28F 21/089* (2013.01)

(56) References Cited

FOREIGN PATENT DOCUMENTS

| | | |
|---|---|---|
| JP | 60-37294 | 2/1985 |
| JP | 61-99569 | 5/1986 |
| JP | 61-162295 | 7/1986 |
| JP | 2008-23553 | 2/2008 |
| WO | WO 2013/061843 A1 | 5/2013 |

OTHER PUBLICATIONS

Written Opinion dated Jul. 1, 2014 in PCT/JP2014/060868 filed Apr. 16, 2014(with English translation).

BRAZING SHEET AND FLUX COMPOSITION

TECHNICAL FIELD

The present invention relates to a brazing sheet and flux composition.

BACKGROUND ART

With recently increasing concerns about environmental issues, weight reduction has been performed more and more for better fuel efficiency typically in the automobile industry. To meet the requirement in weight reduction, investigations have been made actively so as to allow aluminum clad materials (brazing sheets) for automobile heat exchangers to have a lesser wall thickness and a higher strength. The brazing sheets generally have a three-layer structure including layers of a sacrificial material (e.g., Al—Zn material), a core material (e.g., Al—Si—Mn—Cu material), and a brazing material (e.g., Al—Si material) laminated in this order. For higher strength, investigations have been made to add magnesium (Mg) to the core material, namely to strengthen the core material by $Mg_2Si$ precipitation.

In addition, flux brazing is widely employed for the bonding of a brazing sheet to assembly a heat exchanger. The flux contributes to better brazeability, and one containing $KAlF_4$ as a principal component is generally employed.

However, the customary flux, when used in a brazing sheet having a core material including an aluminum alloy containing magnesium disadvantageously adversely affects the brazeability. Upon heating for brazing, magnesium in the core material migrates into the flux in the brazing material surface and reacts with the flux component to form high-melting-point compounds such as $KMgF_3$ and $MgF_2$. This consumes the flux component and probably causes the disadvantage. To prevent this, a flux composition for a magnesium-containing aluminum alloy should be developed so as to advance the weight reduction typically of automobile heat exchangers.

Under these circumstances, to help a brazing sheet including a magnesium-containing aluminum alloy as a core material, there have been made investigations on (1) a flux composition further containing CsF in addition to the customary flux component (see JP-A-S61-162295); and (2) a flux composition further containing $CaF_2$, NaF, or LiF in addition to the customary flux component (see JP-A-S61-99569).

However, the flux composition (1) further containing CsF is not suitable for mass production and is poorly practical, because Cs is very expensive. In turn, the flux composition (2) further containing $CaF_2$ or another specific compound exhibits better fluidity as the flux, because the added compound helps the flux to have a lower melting point. Even this flux composition, however, fails to provide sufficiently better brazeability, because even this flux reacts with magnesium as in the customary technique. Independently, a brazing sheet exhibits better brazeability by increasing the applied amount of a flux. However, such increased applied amount causes higher cost. To prevent this, demands have been made to develop a flux that enables satisfactory brazing with low cost.

CITATION LIST

Patent Literature

Patent Document 1: JP-A-S61-162295
Patent Document 2: JP-A-S61-99569

SUMMARY OF THE INVENTION

Problems that the Invention is to Solve

The present invention has been made under these circumstances, and an object thereof is to provide a brazing sheet and a flux composition which can contribute to better brazeability with low cost while suppressing the applied amount of the flux composition.

Means for Solving the Problems

The present inventors focused attention on the fact that a cause of brazeability deterioration of a magnesium-containing aluminum alloy is not only because magnesium and the flux component ($KAlF_4$) react with each other to form magnesium-containing high-melting-point compounds as has been reported but also because a relative amount of $KAlF_4$ that is a low-melting-point eutectic composition contributing to better brazeability is reduced in the flux composition. Based on this, the present inventors have found that better brazeability can be obtained by adding a specific amount of $AlF_3$ to the flux component for maintaining the relative amount of the $KAlF_4$ in the flux component. The present invention has been made based on these findings.

That is, in the present invention for solving the above problems, a brazing sheet includes:
a core material including an aluminum alloy including magnesium;
a bonding material laminated on at least one side of the core material; and
a flux layer laminated on one side of the bonding material and including a flux composition,
wherein the flux composition includes:
[A] a flux component including $KAlF_4$; and
[B] $AlF_3$, and
a substance mass $S_1$ (mol) of magnesium in the bonding material when heated at 585° C., a substance mass $S_2$ (mol) of [A] the flux component comprising $KAlF_4$ in the flux layer and a substance mass $S_3$ (mol) of [B] $AlF_3$ satisfy the following expression (1).
[Math. 1]

$$6S_1/(42S_2-18S_1) \leq S_3/S_2 \leq 80S_1/(42S_2-18S_1) \quad (1)$$

The brazing sheet contains [B] $AlF_3$. Therefore, this [B] $AlF_3$ probably reacts with $K_3AlF_6$ which is to be formed during brazing, thereby forming $KAlF_4$. Furthermore, in the brazing sheet, [B] $AlF_3$ is added to the flux layer so as to satisfy the above expression (1), and thus, the relative amount of $KAlF_4$ in the flux component can be easily and surely compensated, in which $KAlF_4$ has been reduced by the reaction with magnesium, so that better brazeability can be effectively obtained. This helps the brazing sheet to exhibit better brazeability while suppressing the applied amount of the flux layer.

In a preferred embodiment, the flux composition contains a particle including [A] the flux component; and a particle including [B] $AlF_3$. Thus, [A] the flux component and [B] $AlF_3$, when included in different particles from each other as in this embodiment, contributes to suppression of the reaction of [A] the flux component with [B] AlF$_3$ and inhibition of deterioration of fluidity through elevation in melting point of the flux composition. This helps the flux composition to exhibit better brazeability effectively.

In a preferred embodiment, an applied amount of the flux composition in the flux layer is 0.5 g/m$^2$ or more and 100 g/m$^2$ or less in terms of solid content. The brazing sheet according to this embodiment employs the flux composition in an amount within the above-specified range and can save the production cost while exhibiting superior brazeability.

Moreover, to achieve the object, the present invention further provides:

a flux composition for brazing of a magnesium-containing aluminum alloy material on a surface of which a bonding material is laminated, containing:

[A] a flux component including KAlF$_4$; and
[B] AlF$_3$, wherein a substance mass $S_1$ (mol) of magnesium in the bonding material when heated at 585° C. and a substance mass $S_2$ (mol) of [A] the flux component including KAlF$_4$ in the flux layer and a substance mass $S_3$ (mol) of [B] AlF$_3$ satisfy the following expression (1).

[Math. 2]

$$6S_1/(42S_2-18S_1) \le S_3/S_2 \le 80S_1/(42S_2-18S_1) \qquad (1)$$

In the flux composition, [B] AlF$_3$ is added to the flux layer so as to satisfy the above expression (1), and thus, the relative amount of KAlF$_4$ in the flux component can be easily and surely compensated, in which KAlF$_4$ has been reduced by the reaction with magnesium, so that better brazeability can be effectively obtained. This helps the flux composition to exhibit better brazeability while suppressing the applied amount of the flux layer.

The "applied amount of the flux composition" is a value calculated by dividing the solid mass (g) of the flux composition by the area (m$^2$) of one side of the core material.

Advantageous Effects of the Invention

As described above, in the brazing sheet and the flux composition according to the present invention, since the flux composition in the flux layer has excellent fluidity, better brazeability can be provided while reducing the applied amount of the flux composition. The brazing sheet or flux composition according to the present invention therefore gives, through brazing, a structure that can have both a high strength and a lighter weight and is usable typically as or in an automobile heat exchanger.

EMBODIMENTS FOR CARRYING OUT THE INVENTION

The brazing sheet and the flux composition each according to the present invention will be described below with reference to the figures.

Figure 1:
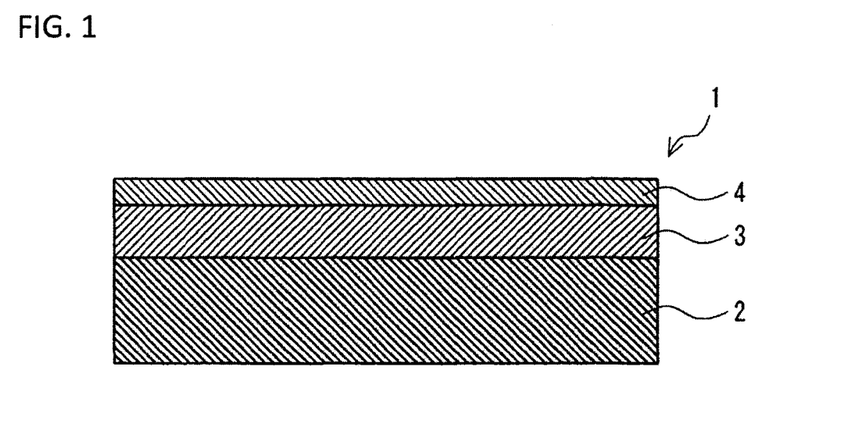
FIG. 1 is a schematic cross-sectional view illustrating a brazing sheet of one embodiment according to the present invention.

The brazing sheet 1 in FIG. 1 includes a core material 2 including an aluminum alloy containing magnesium; a brazing material 3 that is a bonding material laminated on at least one side of the core material 2; and a flux layer 4 laminated on one side of the brazing material 3 and including a flux composition.

<Core Material>

The core material 2 includes, as a main component, an aluminum alloy containing magnesium. By employing a magnesium-containing aluminum alloy as the core material, a light weight of the brazing sheet 1 can be achieved. In turn, since the brazing sheet has a flux layer 4 formed from the flux composition to be mentioned later, superior brazeability can be exhibited even when the magnesium-containing aluminum alloy is employed.

The upper limit of the magnesium content in the core material 2 is preferably 1.5 mass %, more preferably 1.0 mass %, and particularly preferably 0.5 mass %. When the magnesium content is higher than the upper limit, brazeability of the brazing sheet 1 may not be sufficiently exhibited. The lower limit of the magnesium content in the core material 2 is not particularly limited and is typically 0.01 mass %.

The average thickness of the core material 2 is not particularly limited and is, for example, 0.05 mm or more and 0.3 mm or less.

<Brazing Material>

A material of the brazing material 3 is not particularly limited and a conventional brazing material can be used. The brazing material preferably has a melting point higher than that of [A] the flux component by about 10° C. to about 100° C. Examples thereof include Al—Si alloys, and Al—Si alloys having a Si content of 5 parts by mass or more and 15 parts by mass or less are more preferred. Such Al—Si alloys (brazing materials) may further contain one or more of other elements such as Zn and Cu.

The average thickness of the brazing material 3 is not particularly limited and is, for example, 15 μm or more and 100 μm or less.

<Flux Layer>

The flux layer 4 is a layer formed from the flux composition according to the present invention. The flux composition will be described in detail below.

The flux composition to form the flux layer 4 contains [A] a flux component including KAlF$_4$; and [B] AlF$_3$.

Since the flux composition contains [B] AlF$_3$, this [B] AlF$_3$ probably reacts with K$_3$AlF$_6$ which is to be formed during brazing, thereby forming KAlF$_4$. The flux composition can therefore prevent KAlF$_4$ which is necessary for better brazeability from decreasing and can contribute to better brazeability even it is used in a small applied amount (deposition amount). In addition, [B] AlF$_3$ does not impede brazing by the action of [A] the flux component. The respective components will be illustrated below.

[A] Flux Component

[A] The flux component is not particularly limited as long as it is a brazing flux component including KAlF$_4$. This [A] flux component exhibits the functions of melting preferentially to the component of the bonding material 3 during heating and temperature-rising process upon brazing, and removing an oxide film on the aluminum alloy material surface; and the function of covering the aluminum alloy material surface to prevent aluminum from reoxidation.

[A] The flux component may further include component(s) other than KAlF$_4$. The component(s) other than KAlF$_4$ are not particularly limited and examples thereof include those to be contained in conventional flux components. As the optional component(s), examples thereof include other fluorides such as KF, $K_2AlF_5$, and $K_3AlF_6$; and hydrates such as $K_2(AlF_5)(H_2O)$. Of the other components, $K_2AlF_5$, for example, reacts with Mg during brazing/heating to form $K_3AlF_6$. The resulting $K_3AlF_6$ reacts with [B] $AlF_3$ to form $KAlF_4$ as described above, and as a result, better brazeability is probably obtained. A similar effect is probably exhibited when $K_3AlF_6$ is originally present in [A] the flux component, because $K_3AlF_6$ reacts with [B] $AlF_3$. Even when the component(s) other than $KAlF_4$ as the essential component are contained, the advantageous effects of the present invention can probably be exhibited by allowing [B] $AlF_3$ to exist in such a state where $K_3AlF_6$ is formed or is present, as mentioned above.

The content of $KAlF_4$ in [A] the flux component is not particularly limited, but is preferably 50 mass % or more, and more preferably 70 mass % or more.

[A] The flux component may exist in a form which is not particularly limited, but preferably exists as particles including [A] the flux component. More preferably, [A] the flux component exists as particles including no [B] $AlF_3$ (e.g., particles including only [A] the flux component). The particles herein are not particularly limited and may have any shape such as a spherical or amorphous shape. If particles including both [A] the flux component and [B] $AlF_3$ are used, the presence of [B] $AlF_3$ may cause [A] the flux component to have a higher melting point. The separation of [A] the flux component from [B] $AlF_3$ into different particles prevents [A] the flux component from having a higher melting point, and this results in further better brazeability. In addition, the flux composition becomes an aggregate of particles and thus is easy to be handled.

The flux composition has a melting point, if risen, higher than the melting point of [A] the flux component preferably by 15° C. or less, and more preferably by 10° C. or less. The flux composition has a melting point of preferably 580° C. or lower, and more preferably 570° C. or lower in terms of upper limit. The flux composition, when controlled not to have a higher melting point in this manner, can exhibit further better brazeability. The lower limit of the melting point of the flux composition is not particularly limited, but can be, for example, 520° C. and is preferably 540° C.

[B] $AlF_3$

In the brazing sheet 1, [B] $AlF_3$, when added to [A] the flux component, enables more efficient formation of $KAlF_4$ from $K_3AlF_6$. [B] $AlF_3$ may be a hydrate, but is preferably an anhydride.

[B] $AlF_3$ may exist in a form which is not particularly limited, but preferably exist as particles including [B] $AlF_3$. [B] $AlF_3$ more preferably exist as particles including no [A] flux component (e.g., particles including only [B] $AlF_3$). The particles may have any shape which is not particularly limited, such as spherical or amorphous shape. As described above, separation of [A] the flux component from [B] $AlF_3$ into different particles can prevent [A] the flux component from having a higher melting point and contributes to further better brazeability.

In the brazing sheet 1, the substance mass $S_1$ (mol) of magnesium in the brazing material 3 when heated at 585° C. and the substance mass $S_2$ (mol) of [A] the flux component including $KAlF_4$ in the flux layer 4 and the substance mass $S_3$(mol) of [B] $AlF_3$ satisfy the following expression (1):

[Math. 3]

$$6S_1/(42S_2-18S_1) \leq S_3/S_2 \leq 80S_1/(42S_2-18S_1) \quad (1).$$

The derivation theory of the above expression (1) will be described below. The reaction formula of KF and $AlF_3$ resulting from the decomposition of $KAlF_4$ in the flux composition during brazing with magnesium has been variously proposed. Assuming that products of the reaction of the flux component with magnesium are $MgF_2$ and $KMgF_3$ and $K_3AlF_6$ is a secondary product by composition change of the flux component, the reaction formula may be represented by the following expression (2) (see Takemoto et., Journal of Light Metal Welding, vol. 35, No. 1 (1997)):

$$4KF+14AlF_3+21Mg \rightarrow 4KMgF_3+17MgF_2+14Al \quad (2)$$

From the expression (2), 4 mol of KF and 14 mol of $AlF_3$ are consumed for 21 mol of Mg. The substance mass $S_{KF}$ (mol) of KF and the substance mass $S_{AlF3}$ (mol) of $AlF_3$ after the reaction of the flux component with magnesium during brazing are therefore represented by the following expressions (3) and (4), respectively:

$$S_{KF}=S_2-4S_1/21 \quad (3)$$

$$S_{AlF3}=S_2-14S_1/21 \quad (4)$$

As mentioned above, in order to exhibit better brazeability, it is necessary to increase the relative amount of $KAlF_4$ in the flux. After the flux component reacts with magnesium during brazing, the ratio of the substance ratio of KF to $AlF_3$ becomes not 1:1 as mentioned above. When $AlF_3$ is added so that the substance ratio of KF to $AlF_3$ approaches 1:1, the substance mass of $KAlF_4$ can be increased without adding extra composition and the decrease in the relative amount of $KAlF_4$ can be surely compensated. Namely, the present inventors have found that the substance ratio $C_{KF}$ of KF to the total substance mass of KF and $AlF_3$ during brazing, which is represented by the following expression (5), and the substance ratio $C_{AlF3}$ of $AlF_3$ to the total substance mass of KF and $AlF_3$ after the flux component and magnesium are reacted with each other during brazing, which is represented by the following expression (6), are to be determined and the substance ratio of [B] $AlF_3$, which corresponds to a difference dC between $C_{KF}$ and $C_{AlF3}$, is to be added to [A] the flux component. The difference dC between $C_{KF}$ and $C_{AlF3}$ is represented by the following expression (7).

$$C_{KF}=S_{KF}/(S_{KF}+S_{AlF3}) \times 100 \quad (5)$$

$$C_{AlF3}=S_{AlF3}/(S_{KF}+S_{AlF3}) \times 100 \quad (6)$$

$$dC=C_{KF}-C_{AlF3} \quad (7)$$

The above expression (7) is represented as the following expression (8) based on the expressions (3) and (4):

$$dC=10S_1/(42S_2-18S_1) \times 100 \quad (8)$$

Upon actual brazing, a decomposition reaction of $KAlF_4$ other than the above may occur and all the $AlF_3$ added does not necessarily contribute to the compensation of $KAlF_4$ (it may react with other substance(s)). The present inventors have therefore conducted the following test, in order to confirm an optimum range of the addition amount of [B] $AlF_3$ that contributes to better brazeability, on the basis of the above theory. First, a flux composition was obtained by adding and suspending [A] the flux component and [B] $AlF_3$ into 100 mL of ion-exchanged water. [A] The flux component used herein was particles including 80 vol. % of $KAlF_4$ and 20 vol. % of $K_2(AlF_5)(H_2O)$. [B] $AlF_3$ used herein was in the form of particles.

The prepared flux composition was applied to a brazing sheet substrate surface (brazing material surface) and dried to form a flux layer. This gave a brazing sheet. The respective powdery components were applied uniformly by applying the flux composition as a suspension and removing ion-exchanged water by drying. The brazing sheet substrate used was one including a core material including a magnesium-containing aluminum alloy and a brazing material (JIS 4045, clad percentage: 15%) laminated on a surface of the core material. The brazing sheet substrate has a thickness of 0.2 mm and the applied surface of the flux has a size of 60 mm×25 mm.

The brazeability of the brazing sheet was evaluated by a method according to Japan Light Metal Welding & Construction Association Standard (LWS T8801). The specific evaluation method will be illustrated below with reference to FIG. 2. The prepared brazing sheet was placed and stood as a lower sheet 101 so that the flux layer faced upward. 3003 Al alloy (base metal) having a thickness of 1.0 mm was stood as an upper sheet 102 on the top surface of the lower sheet 101. A SUS rod-form (ϕ 2 mm) spacer 103 was placed between the lower sheet 101 and one end of the upper sheet 102 to provide a space between the lower sheet 101 and the one end of the upper sheet 102. The distance between the contact point of the lower sheet 101 with the upper sheet 102 and the spacer was 55 mm.

Figure 2:
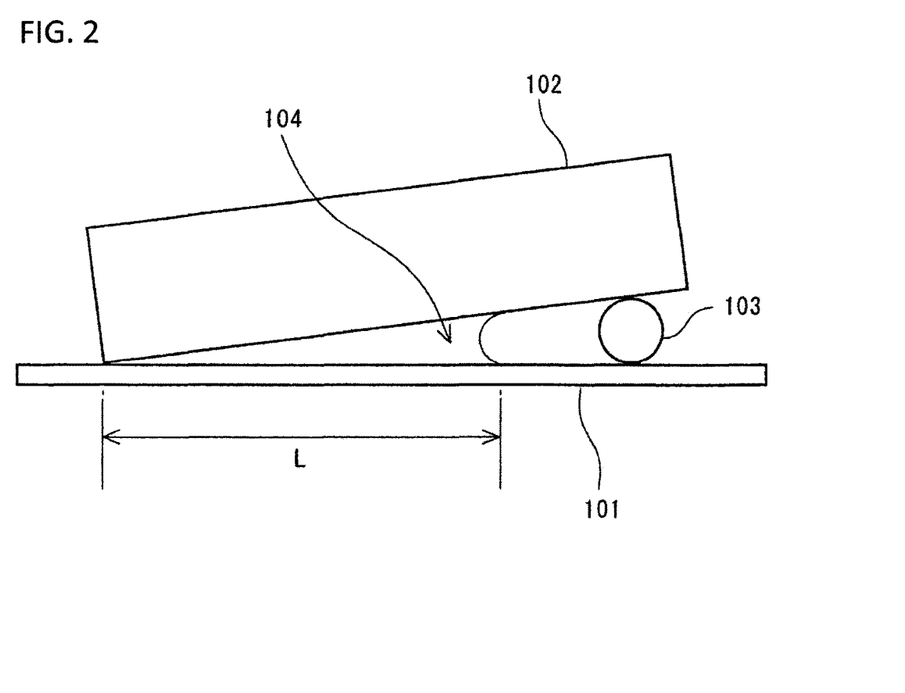
FIG. 2 is a schematic view illustrating an evaluation method of brazeability of a brazing sheet.

The specimen in this state was subjected to a space fillability test. Specifically, brazing of the lower sheet 101 with the upper sheet 102 was performed by heating at 600° C. for 10 minutes in an atmosphere with a dew point of −40° C. and an oxygen concentration of 100 ppm or less. The temperature was risen from room temperature up to 600° C. at an average rate of temperature rise of 50° C./min. The length (fillet-forming length L) of a fillet 104 formed by the brazing/heating was measured.

Figure 3:
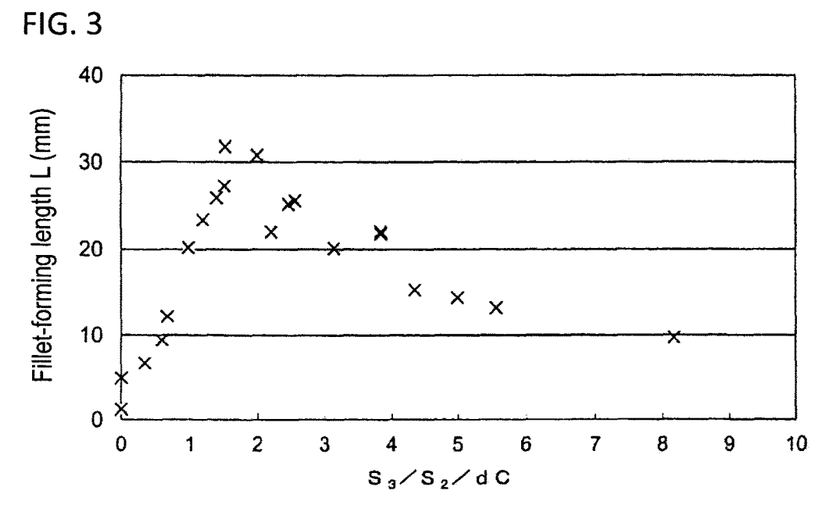
FIG. 3 is a graph illustrating a relationship between an addition ratio of AlF$_3$ and fillet growth length.

The above-described test was repeated with changing the addition amount of [B] $AlF_3$, the applied amount of the flux composition on the brazing sheet substrate, and the magnesium content in the brazing material when heated at 585° C. Thus, a relationship between the ratio $(S_3/S_2/dC)$ of the addition ratio $(S_3/S_2)$ of [B] $AlF_3$ to the dC shown in the graph of FIG. 3 and the fillet-forming length L was obtained. As realized from the graph of FIG. 3, the fillet-forming length becomes remarkably large in the case where the ratio $(S_3/S_2/dC)$ is from 1 to 2 but, in contrast, in the case where the ratio is less than 0.6 or exceeds 8, the fillet-forming length becomes less than 10 mm, so that the brazeability is improved but practicability becomes poor as compared with the case where [B] $AlF_3$ is not added. Therefore, the addition ratio $(S_3/S_2)$ of [B] $AlF_3$ should satisfy the following expression (9) and the above expression (1) is derived from the expression (9) and the above expression (8):

$$0.6dC \leq S_3/S_2 \leq 8dC \quad (9)$$

As shown in the graph of FIG. 3, in order to exhibit further better brazeability, i.e., in order to make the fillet-forming length 20 mm or more, the ratio $(S_3/S_2/dC)$ of the addition ratio $(S_3/S_2)$ of [B] $AlF_3$ to dC is more preferably 1 or more and 4 or less, that is, the ratios satisfy the following expression (10) or (11).

$$dC \leq S_3/S_2 \quad (10)$$

$$S_3/S_2 \leq 4dC \quad (11)$$

The substance mass $S_1$ of magnesium in the brazing material and the substance mass $S_2$ of [A] the flux component are determined by the following expressions (12) and (13), respectively. In the expression (12), p is density of aluminum (2.7 g/cm$^3$) used in the brazing material, v is volume (cm$^3$) of the brazing material, d is average magnesium concentration (mass %) in the brazing material, and $M_1$ is molecular weight of magnesium (24 g/mol). In the expression (13), p is an applied amount (g/m$^2$) of [A] the flux component, s is applied area (m$^2$) of the flux composition, and $M_2$ is molecular weight of $KAlF_4$ (142 g/mol) that is a flux component.

$$S_1 = (\Sigma \times v \times d)/(100 \times M_1) \quad (12)$$

$$S_2 = p \times s/M_{2\,nm} \quad (13)$$

The average magnesium concentration d in the brazing material can be measured by an electron beam microanalyzer (EPMA). Moreover, the applied amount p of [A] the flux component is calculated by dividing the solid mass (g) of [A] the flux component by the applied area (0.0015 m$^2$).

The substance mass of magnesium in the brazing material when heated at 585° C. is determined by the material composition of the brazing material and the core material and the process (thermal history). Accordingly, for one skilled in the art, when the substance mass of magnesium in the brazing material is once measured when heated at 585° C., it is possible to surmise the substance mass of magnesium for the brazing material having the same material composition and process without measurement. Therefore, according to the flux composition in the present invention, when the compositions of a brazing material and core material for brazing is decided, a flux composition to exhibit better brazeability can be determined without substantially measuring the Mg substance mass ($S_1$) in the brazing material when heated at 585° C.

The upper limit of the average particle diameter d of [B] $AlF_3$ is preferably 300 μm, more preferably 200 μm, and further preferably 150 μm. When the average particle diameter d of [B] $AlF_3$ exceeds the upper limit, the fixing ability of the flux composition to the brazing material 3 might decrease and, in the case of spraying, the particle diameter becomes larger than the spray nozzle diameter, so that the spraying might become impossible.

The lower limit of the average particle diameter d of [B] $AlF_3$ is preferably 0.1 μm, more preferably 1 μm, and further preferably 5 μm. When the average particle diameter d of [B] $AlF_3$ is less than the lower limit, the solid phase ratio in the flux composition might increase to lower the fluidity and also the production of particles might become difficult.

Moreover, the flux composition may further contain additional component(s) other than [A] the flux component and [B] $AlF_3$, within ranges not adversely affecting advantageous effects of the present invention. As the component, for example, a melting-point-lowering agent may be mentioned. The flux composition, when containing the melting-point-lowering agent, can prevent [A] the flux component from having a higher melting point and can have further better brazeability.

The melting-point-lowering agent is a component having the effect of suppressing melting point rise of [A] the flux component. The melting-point-lowering agent is not particularly limited as long as it has the above effect, and examples thereof include fluorides of alkali metals and alkaline earth metals other than potassium, such as NaF, LiF, CSF, and $CaF_2$. Among them, alkali metal fluorides are preferred, and NaF and LiF are more preferred. NaF and LiF, when used, can contribute to better brazeability by allowing to have a lower melting point. These melting-point-lowering agents may be used alone or in combination thereof.

The addition amount of the melting-point-lowering agent is not particularly limited, but is preferably 0.1 part by mass or more and 30 parts by mass or less, and more preferably 0.5 parts by mass or more and 20 parts by mass or less, per 100 parts by mass of [A] the flux component. The meltingpoint-lowering agent, if contained in a content higher than the upper limit, causes a relatively lower content of [A] the flux component in the flux composition, and this might adversely affect the brazeability. In contrast, the melting-point-lowering agent, if contained in a content lower than the lower limit, might fail to exhibit its effects sufficiently.

The flux composition may be manufactured by any method which is not particularly limited and may be manufactured by mixing [A] the flux component, [B] $AlF_3$, and, where necessary, the melting-point-lowering agent and the like in a suitable ratio. As the method for the mixing, examples thereof include: (1) a method of uniformly mixing respective powdery components with each other to give a powdery flux composition; (2) a method of mixing respective powdery components to give a mixture, heating and melting the mixture in a crucible, and cooling the resulting mixture to give a solid or powdery flux composition; and (3) a method of suspending respective powdery components in a solvent such as water to give a paste or slurry flux composition. The methods (1) and (3) are preferred in order to contain particles including [A] the flux component and particles including [B] $AlF_3$, as described above.

The flux layer 4 may be formed by any method which is not particularly limited, but examples thereof include a method of applying a powdery flux as intact to a surface of the brazing material 3 using a sprayer or the like; and a method of applying a slurry or paste flux composition on a surface of the brazing material 3 or immersing the brazing material 3 in the slurry or paste flux composition, and evaporating a dispersion medium component, thereby allowing only the flux composition to deposit thereon. The dispersion medium component is generally water, but can also be an organic solvent such as an alcohol.

The lower limit of the applied amount of the flux composition in the flux layer 4 is not particularly limited, but is preferably 0.5 $g/m^2$, and more preferably 1 $g/m^2$. When the applied amount of the flux composition is equal to or more than the lower limit, sufficient brazeability can be exhibited. In contrast, the upper limit of the applied amount of the flux composition is preferably 100 $g/m^2$, more preferably 60 $g/m^2$, furthermore preferably 20 $g/m^2$, and particularly preferably 10 $g/m^2$. When the applied amount of the flux composition is equal to or lower than the upper limit, the used amount of the flux composition can be reduced while maintaining brazeability, and cost reduction can be achieved.

The size of the brazing sheet 1 is not particularly limited and conventional sizes can be employed. For example, the brazing sheet 1 can have a thickness of 0.1 mm or more and 2 mm or less. The brazing sheet 1 may be manufactured by any method which is not particularly limited and can be manufactured by a conventional method.

(Use Method of Brazing Sheet According to Present Invention)

The brazing sheet 1 can be used (brazed) by a conventional method. Heating conditions (e.g., temperature, rate of temperature rise, and oxygen concentration or the like) for brazing of the brazing sheet 1 are exemplified by the following conditions.

As heating temperature during brazing, the brazing can be performed by melting the flux component and the brazing material 3 at a temperature lower than the melting point of the aluminum alloy of the core material 2 and higher than the melting point of the flux (e.g., 580° C. or higher and 615° C. or lower).

The heating may be performed at a rate of temperature rise of from about 10° C. to about 100° C. per minute. The heating time is not particularly limited and is preferably short in order to reduce the amount of magnesium migration that adversely affects the brazeability. The heating time is, for example, from about 5 to 20 minutes.

The heating may be performed under conventional ambient conditions and is preferably performed in a non-oxidizing atmosphere such as an inert gas atmosphere. The heating may be performed at an oxygen concentration of preferably 1,000 ppm or less, more preferably 400 ppm or less, and furthermore preferably 100 ppm or less from the viewpoint of oxidation suppression. The heating is preferably performed in an atmosphere with a dew point of -35° C. or lower.

(Structure)

A structure formed from the brazing sheet 1 has a firmly bonded brazing portion. The structure can therefore have both a high strength and a lighter weight as a structure using a magnesium-containing aluminum alloy.

As the structure, specific examples thereof include automobile heat exchangers such as radiators, evaporators, and condensers. The heat exchangers, as employing the brazing sheet 1 including an aluminum alloy material (core material) containing magnesium, can have a higher strength and a smaller wall thickness. The heat exchangers, as employing the flux composition of the brazing sheet 1, have superior brazeability and are firmly brazed.

[Other Embodiments]

The brazing sheet according to the present invention is not limited to the above embodiments. With regard to the brazing sheet, as layer structures between the core material and the brazing material, examples thereof include structures having three or more layers, such as a structure of "brazing material/core material/brazing material" (three-layer structure with both-sided brazing material); and a structure of "brazing material/core material/intermediate layer/brazing material" (four-layer structure).

Figure 4:
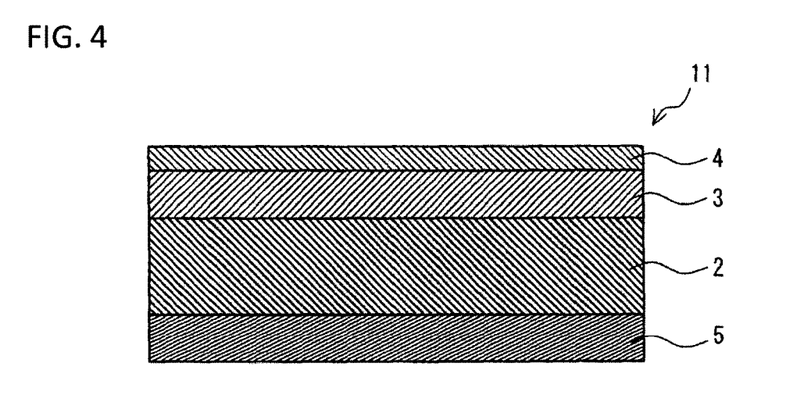
FIG. 4 is a schematic cross-sectional view illustrating a brazing sheet of an embodiment different from the brazing sheet in FIG. 1.

The brazing sheet may further include, as the brazing sheet 11 shown in FIG. 4, a sacrificial material 5 which is laminated on the other side of the core material 2 and has a potential baser than that of the core material 2. The brazing sheet 11, when including the sacrificial material 5, has superior corrosion resistance.

The material of the sacrificial material 5 is not particularly limited as long as it has a potential baser than that of the core material 2. Examples of the material include Al—Zn alloys having a Zn content of from 1 to 10 mass %; and Al alloys obtained by adding from 0.5 to 1.1 mass % of Si and 2.0 mass % or less of Mn to the Al—Zn alloys.

Furthermore, it is also possible to laminate the flux composition according to the present invention on the surface of the sacrificial material. Therefore, a brazing sheet in which the bonding material is a sacrificial material and a flux layer is laminated on the surface of the sacrificial material also falls within the intended range of the present invention. Moreover, the bonding material for attaching the flux composition is not limited to the brazing material and the sacrificial material as long as it is an aluminum alloy material.

EXAMPLES

The present invention will be illustrated in further detail with reference to working examples below. It should be noted, however, that these examples are by no means intended to limit the scope of the present invention.

Examples 1 to 9 and Comparative Examples 1 to 4

Flux compositions were prepared by adding and suspending [A] a flux component and [B] $AlF_3$ into 100 mL of ion-exchanged water. [A] The flux component used herein was particles including 80 vol. % of $KAlF_4$ and 20 vol. % of $K_2(AlF_5)(H_2O)$. [B] $AlF_3$ used herein was one in the form of particles. Also, [B] $AlF_3$ was added so that the substance mass ($S_3$) became a value shown in Table 1 after applying the flux composition.

Then, each of the above-prepared flux compositions was applied to a brazing sheet substrate surface (brazing material surface) and dried to form a flux layer. This gave brazing sheets according to Examples 1 to 9 and Comparative Examples 1 to 4. The applied amount of the flux composition was controlled so that the applied amount (p) of [A] the flux component became the value shown in Table 1. The respective powdery components were applied uniformly by applying the flux composition as a suspension and removing ion-exchanged water by drying. The brazing sheet substrate used was one including a core material including a magnesium-containing aluminum alloy and a brazing material (JIS 4045, clad percentage: 15%) laminated on a surface of the core material. The brazing sheet substrate had a thickness of 0.2 mm and a flux-applying area was 60 mm×25 mm. The brazing material had a size of a width of 25 mm, a length of 60 mm, and a thickness of 30 μm. The value of the average magnesium concentration in the brazing material measured by an electron beam microanalyzer (EPMA) was 0.15 mass % when the brazing sheet was heated to 585° C. The applied amount p of [A] the flux component was calculated by dividing the solid mass (g) of [A] the flux component by the applied area (0.0015 $m^2$).

Examples 10 to 16 and Comparative Example 5

Brazing sheets according to Examples 10 to 16 and Comparative Example 5 were obtained using the applied amount (p) of [A] the flux component shown in Table 1 and the substance mass ($S_3$) of [B] $AlF_3$ shown in Table 1 in the same manner as in the above Examples 1 to 9 and Comparative Examples 1 to 4 except that a brazing sheet substrate having an average magnesium concentration of 0.30 mass % in the brazing material measured by an electron beam microanalyzer (EPMA) after heating to 585° C.

[Evaluation for Brazeability]

The brazeability of each of the brazing sheets according to the above Examples 1 to 16 and Comparative Examples 1 to 5 was evaluated by a method according to Japan Light Metal Welding & Construction Association Standard (LWS T8801). The specific evaluation method will be illustrated below with reference to FIG. 2. Each prepared brazing sheet was placed and stood as a lower sheet 101 so that the flux layer faced upward. 3003 Al alloy (base metal) having a thickness of 1.0 mm was stood as an upper sheet 102 on the top surface of the lower sheet 101. A SUS rod-form (φ 2 mm) spacer 103 was placed between the lower sheet 101 and one end of the upper sheet 102 to provide a space between the lower sheet 101 and the one end of the upper sheet 102. The distance between the contact point of the lower sheet 101 with the upper sheet 102 and the spacer was 55 mm.

The specimen in this state was subjected to a space fillability test. Specifically, brazing of the lower sheet 101 with the upper sheet 102 was performed by heating at 600° C. for 10 minutes in an atmosphere with a dew point of −40° C. and an oxygen concentration of 100 ppm or less. The temperature was risen from room temperature up to 600° C. at an average rate of temperature rise of 50° C./min. The length (fillet-forming length) of a fillet 104 formed by the brazing/heating was measured. Table 1 shows measurement results for Examples 1 to 16 and Comparative Examples 1 to 5.

TABLE 1

| | Brazing material Substance mass of Mg ($S_1$) mol | Flux composition | | | | | |
|---|---|---|---|---|---|---|---|
| | | Applied amount of [A] flux component (p) g/$m^2$ | Substance mass of [A] flux component ($S_2$) mol | Substance mass of [B] $AlF_3$ ($S_3$) mol | $S_3/S_2$ mol % | $S_{KF}$ mol | $S_{AlF3}$ mol |
| Ex. 1 | 7.59E−06 | 3 | 3.17E−05 | 2.41E−06 | 7.6 | 3.02E−05 | 2.66E−05 |
| Ex. 2 | 7.59E−06 | 3 | 3.17E−05 | 3.07E−06 | 9.7 | 3.02E−05 | 2.66E−05 |
| Ex. 3 | 7.59E−06 | 3 | 3.17E−05 | 4.02E−06 | 12.7 | 3.02E−05 | 2.66E−05 |
| Ex. 4 | 7.59E−06 | 3 | 3.17E−05 | 4.44E−06 | 14 | 3.02E−05 | 2.66E−05 |
| Ex. 5 | 7.59E−06 | 3 | 3.17E−05 | 6.34E−06 | 20 | 3.02E−05 | 2.66E−05 |
| Ex. 6 | 7.59E−06 | 3 | 3.17E−05 | 8.78E−06 | 27.7 | 3.02E−05 | 2.66E−05 |
| Ex. 7 | 7.59E−06 | 3 | 3.17E−05 | 1.12E−05 | 35.4 | 3.02E−05 | 2.66E−05 |
| Ex. 8 | 7.59E−06 | 5 | 5.28E−05 | 7.39E−06 | 14 | 5.14E−05 | 4.78E−05 |
| Ex. 9 | 7.59E−06 | 5 | 5.28E−05 | 7.39E−06 | 14 | 5.14E−05 | 4.78E−05 |
| Ex. 10 | 1.52E−05 | 3 | 3.17E−05 | 4.44E−06 | 14 | 2.88E−05 | 2.16E−05 |
| Ex. 11 | 1.52E−05 | 3 | 3.17E−05 | 1.12E−05 | 35.4 | 2.88E−05 | 2.16E−05 |
| Ex. 12 | 1.52E−05 | 3 | 3.17E−05 | 3.07E−06 | 9.7 | 2.88E−05 | 2.16E−05 |
| Ex. 13 | 1.52E−05 | 3 | 3.17E−05 | 6.34E−06 | 20 | 2.88E−05 | 2.16E−05 |
| Ex. 14 | 1.52E−05 | 3 | 3.17E−05 | 2.28E−05 | 71.8 | 2.88E−05 | 2.16E−05 |
| Ex. 15 | 1.52E−05 | 5 | 5.28E−05 | 1.06E−05 | 20 | 4.99E−05 | 4.27E−05 |
| Ex. 16 | 1.52E−05 | 5 | 5.28E−05 | 6.23E−06 | 11.8 | 4.99E−05 | 4.27E−05 |
| Comp. Ex. 1 | 7.59E−06 | 3 | 3.17E−05 | 0 | 0 | 3.02E−05 | 2.66E−05 |
| Comp. Ex. 2 | 7.59E−06 | 3 | 3.17E−05 | 6.97E−07 | 2.2 | 3.02E−05 | 2.66E−05 |
| Comp. Ex. 3 | 7.59E−06 | 3 | 3.17E−05 | 1.20E−06 | 3.8 | 3.02E−05 | 2.66E−05 |
| Comp. Ex. 4 | 7.59E−06 | 3 | 3.17E−05 | 1.65E−05 | 52 | 3.02E−05 | 2.66E−05 |
| Comp. Ex. 5 | 1.52E−05 | 3 | 3.17E−05 | 0 | 0 | 2.88E−05 | 2.16E−05 |

TABLE 1-continued

|  | $C_{KF}$ mol % | $C_{SAlF3}$ mol % | dC mol % | 0.6dC [left side of expression (1)] mol % | 4dC mol % | 8dC [Right side of expression (1)] mol % | Fillet-forming length mm |
|---|---|---|---|---|---|---|---|
| Ex. 1 | 53.2 | 46.8 | 6.4 | 3.82 | 25.4 | 50.9 | 23.4 |
| Ex. 2 | 53.2 | 46.8 | 6.4 | 3.82 | 25.4 | 50.9 | 31.8 |
| Ex. 3 | 53.2 | 46.8 | 6.4 | 3.82 | 25.4 | 50.9 | 30.8 |
| Ex. 4 | 53.2 | 46.8 | 6.4 | 3.82 | 25.4 | 50.9 | 22.0 |
| Ex. 5 | 53.2 | 46.8 | 6.4 | 3.82 | 25.4 | 50.9 | 20.1 |
| Ex. 6 | 53.2 | 46.8 | 6.4 | 3.82 | 25.4 | 50.9 | 15.3 |
| Ex. 7 | 53.2 | 46.8 | 6.4 | 3.82 | 25.4 | 50.9 | 13.2 |
| Ex. 8 | 51.8 | 48.2 | 3.6 | 2.19 | 14.6 | 29.2 | 21.8 |
| Ex. 9 | 51.8 | 48.2 | 3.6 | 2.19 | 14.6 | 29.2 | 22.0 |
| Ex. 10 | 57.2 | 42.8 | 14.4 | 8.62 | 57.4 | 114.9 | 20.2 |
| Ex. 11 | 57.2 | 42.8 | 14.4 | 8.62 | 57.4 | 114.9 | 25.2 |
| Ex. 12 | 57.2 | 42.8 | 14.4 | 8.62 | 57.4 | 114.9 | 12.2 |
| Ex. 13 | 57.2 | 42.8 | 14.4 | 8.62 | 57.4 | 114.9 | 25.9 |
| Ex. 14 | 57.2 | 42.8 | 14.4 | 8.62 | 57.4 | 114.9 | 14.4 |
| Ex. 15 | 53.9 | 46.1 | 7.8 | 4.69 | 31.2 | 62.5 | 25.6 |
| Ex. 16 | 53.9 | 46.1 | 7.8 | 4.69 | 31.2 | 62.5 | 27.3 |
| Comp. Ex. 1 | 53.2 | 46.8 | 6.4 | 3.82 | 25.4 | 50.9 | 5.0 |
| Comp. Ex. 2 | 53.2 | 46.8 | 6.4 | 3.82 | 25.4 | 50.9 | 6.7 |
| Comp. Ex. 3 | 53.2 | 46.8 | 6.4 | 3.82 | 25.4 | 50.9 | 9.4 |
| Comp. Ex. 4 | 53.2 | 46.8 | 6.4 | 3.82 | 25.4 | 50.9 | 9.7 |
| Comp. Ex. 5 | 57.2 | 42.8 | 14.4 | 8.62 | 57.4 | 114.9 | 1.2 |

As shown in Table 1, it is found that brazing sheets according to the present invention each had a long fillet-forming length and exhibited superior brazeability. Furthermore, it is found that better brazeability is exhibited by controlling the ratio ($S_3/S_2$ mol%) of the substance mass $S_3$ (mol) of [B] $AlF_3$ to the substance mass $S_2$ (mol) of [A] the flux component including $KAlF_4$ to equal to or higher than dC or equal to or lower than 4dC.

While the present invention has been described in detail and with reference to specific embodiments thereof, it will be apparent to one skilled in the art that various changes and modifications can be made therein without departing from the spirit and scope thereof.

The present application is based on Japanese Patent Application No. 2013-093019 filed on Apr. 25, 2013, the entire contents of which are incorporated herein by reference.

INDUSTRIAL APPLICABILITY

The brazing sheet according to the present invention can contribute to better brazeability while the applied amount of the flux composition is small. Specifically, brazing sheet is usable in manufacturing of aluminum alloy-made heat exchangers for automobile use or the like.

DESCRIPTION OF REFERENCE NUMERALS AND SIGNS 1, 11 brazing sheet
2 core material
3 brazing material
4 flux layer
5 sacrificial material
101 lower sheet
102 upper sheet
103 spacer
104 fillet

The invention claimed is:

1. A brazing sheet comprising:
a core material comprising an aluminum alloy comprising magnesium;
a bonding material laminated on at least one side of the core material; and
a flux layer laminated on one side of the bonding material and comprising a flux composition,
wherein the flux composition comprises:
[A] a flux component comprising $KAlF_4$; and
[B] $AlF_3$, and
a substance mass $S_1$ (mol) of magnesium in the bonding material when heated at 585° C., a substance mass $S_2$ (mol) of [A] the flux component comprising $KAlF_4$ in the flux layer and a substance mass $S_3$ (mol) of [B] $AlF_3$ satisfy the following expression (1):

$$6S_1/(42S_2-18S_1) \leq S_3/S_2 \leq 80S_1/(42S_2-18S_1) \quad (1).$$

2. The brazing sheet according to claim 1, wherein the flux composition comprises a particle comprising [A] the flux component and a particle comprising [B] $AlF_3$.

3. The brazing sheet according to claim 1, wherein an applied amount of the flux composition in the flux layer is 0.5 g/m² or more and 100 g/m² or less in terms of solid content.

4. A flux composition for brazing of a magnesium-containing aluminum alloy material on a surface of which a bonding material is laminated, comprising:
[A] a flux component comprising $KAlF_4$; and
[B] $AlF_3$,
wherein a substance mass $S_1$ (mol) of magnesium in the bonding material when heated at 585° C., a substance mass $S_2$ (mol) of [A] the flux component comprising $KAlF_4$ in the flux layer and a substance mass $S_3$ (mol) of [B] $AlF_3$ satisfy the following expression (1):

$$6S_1/(42S_2-18S_1) \leq S_3/S_2 \leq 80S_1/(42S_2-18S_1) \quad (1),$$

and wherein a content of $KAlF_4$ in the flux component [A] is 50 mass % or more.

5. The brazing sheet according to claim 2, wherein an applied amount of the flux composition in the flux layer is 0.5 g/m2 or more and 100 g/m2 or less in terms of solid content.

* * * * *